United States Patent [19]

Miller

[11] Patent Number: 4,774,315

[45] Date of Patent: Sep. 27, 1988

[54] COPOLY ISOPHTHALATE CARBONATE END-CAPPED WITH PARACUMYLPHENOL

[75] Inventor: Kenneth F. Miller, Mt. Vernon, Ind.

[73] Assignee: General Electric Company, Mt. Vernon, Ind.

[21] Appl. No.: 945,457

[22] Filed: Dec. 23, 1986

[51] Int. Cl.[4] ............................................. C08G 63/64
[52] U.S. Cl. ..................................... 528/179; 528/198
[58] Field of Search ............................... 528/179, 198

[56] References Cited

FOREIGN PATENT DOCUMENTS 1152691  8/1983  Canada .

Primary Examiner—Harold D. Anderson
Attorney, Agent, or Firm—Martin B. Barancik

[57] ABSTRACT

A composition comprising a paracumylphenol end-capped aromatic copolyestercarbonate having from about 35 to 95 mole percent ester content which comprises isophthalate or isophthalate and terephthalate units wherein no more than about 50 mole percent of the ester content is terephthalate.

13 Claims, No Drawings

COPOLY ISOPHTHALATE CARBONATE END-CAPPED WITH PARACUMYLPHENOL

BACKGROUND OF THE INVENTION

Aromatic copolyestercarbonates have been known for many years. Their chief property improvement over polycarbonate is a higher distortion temperature under load, allowing it to be used in applications wherein higher temperature properties are required than standard polycarbonates. However, together with the higher temperature properties is the increased difficulty in molding. The melt viscosity is high, therefore requiring a higher temperature and/or more pressure to mold in comparison to the standard polycarbonates.

Various monofunctional groups have been employed to terminate polymers of the polycarbonate family. The standard endcapping monomers are phenol and paratertiary butylphenol. However, other endcapping agents have been disclosed from time to time. In U.S. Pat. No. 3,697,481, Bialous, et al assigned to General Electric Company, a chromanyl radical has been employed to endcap polycarbonates. The description of polycarbonates is broad enough to include copolyestercarbonates such as disclosed in U.S. Pat. No. 3,030,331 and U.S. Pat. No. 3,169,121, see the U.S. Pat. No. 3,697,481 at column 3, lines 59–69. In U.S. Pat. No. 4,238,596 issued to Quinn and assigned to General Electric Company, a new method for preparing copolyestercarbonates is disclosed. Following this new method, Examples 3 and 6 utilize chroman-I as a chain stopper. In Example 3, an aromatic copolyestercarbonate of 18 mole percent ester content is prepared utilizing 100 percent isophthalate units. In Example 6 an aromatic copolyestercarbonate is prepared having 11 percent ester content utilizing 100 percent terephthalate units.

It should be noted that in these cited references there is no general direction toward the paracumyl phenol endcapping substances but rather generally to the chromanyl endgroup utilizing Chroman-I as a specific example. The paracumyl phenol end group is a hydrocarbon except for, of course, the actual aromatic hydroxy linkage. Paracumyl phenol is a known endcapping agent for polycarbonates, see JP No. 57-133149. It is also known to use paracumylphenol as an endcapping agent for copolyestercarbonate having only terephthalate ester groupings and a limited total ester content, see U.S. Pat. No. 4,156,069 issued to Allied.

New chainstopped aromatic copolyestercarbonates have been discovered. These copolyestercarbonates endcapped with paracumyl phenol exhibit interesting processing and physical properties. While combining a high flow, low melt viscosity behavior with virtually undiminished physical properties of Notched Izod, as well as maintaining the impact resistance under heat and aging conditions, the paracumyl endcapped polymers show less color formation at low viscosity while retaining certain physical properties.

SUMMARY OF THE INVENTION

In accordance with the invention there is a composition comprising a paracumyl phenol endcapped aromatic copolyestercarbonate, said copolyestercarbonate having from about 35 to about 95 mole percent ester content, said ester content comprising isophthalate or isophthalate and terephthalate units wherein no more than about 50 mole percent of the ester content is terephthalate. Preferably no more than about 35 mole percent or more preferably 25 mole percent of the ester units are terephthalate.

DETAILED DESCRIPTION OF THE INVENTION

Typical dihydric phenols which can be employed to prepare copolyestercarbonates of the invention are:
2,2-bis(4-hydroxyphenyl)propane (also known as bisphenol-A);
2,4'-dihydroxydiphenyl)methane;
bis(2-hydroxyphenyl)methane;
bis(4-hydroxyphenyl)methane;
bis(4-hydroxyphenyl-5-propylphenyl)methane;
bis(4-hydroxy-2,6-dimethyl-3-methoxyphenyl)methane;
1,1-bis(4-hydroxyphenyl)ethane;
1,1-bis(4-hydroxy-2-ethylphenyl)ethane;
2,2-bis(3-phenyl-4-hydroxyphenyl)propane;
bis(4-hydroxyphenyl)cyclohexylmethane; and
2,2-bis(4-hydroxyphenyl)-1-phenylpropane.

Bisphenols other than those having a carbon atom between the two phenols can also be used. Examples of such bisphenols include bis(hydroxyphenyl)sulfides, bis(hydroxyphenyl)ethers, and bis(hydroxyphenyl)sulfoxides, and the like.

The preferred family of dihydric phenols is illustrated below:

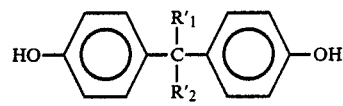

FIG. 1 wherein $R'_1$ and $R'_2$ are the same or different and are hydrogen or alkyl of one to eight carbon atoms, inclusive.

The aromatic copolyestercarbonates suitable for use in the present invention are derived from carbonate precursors and dihydric phenols which are also useful in the preparation of a comparable aromatic polycarbonate. However, more than one appropriate dihydric phenol may be used to prepared copolyestercarbonates of the invention. The aromatic dicarboxylic acid employed in the preparation of the copolyester carbonate is preferably isophthalic acid or mixtures of isophthalic and terephthalic acid. Terephthalic acid can be used alone if desired. Any ester forming derivative of a carboxylic acid whch is reactive with the hydroxyl of a dihyric phenol may be employed. The acid halides are generally employed because of their ease of reactivity and availability. The acid chlorides are preferred.

The standard methods for preparing copolyestercarbonate as indicated in all of the above noted documents and the state of the art preparations available in the journals can be employed to make the endcapped aromatic copolyestercarbonates of this invention. The amount of endcapper present is not unduly significant with respect to the invention. Generally, from about 2 to about 8 mole percent of the endcapping agent can be employed, preferably from about 3 to about 6 mole percent. The mole percent of the endcapping agent is based on the number of moles of dihydric phenol present.

The paracumylphenol molecule is illustrated in the figure below:

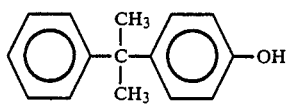

FIG. 2

The preferred aromatic copolyestercarbonates have at least about 50 mole percent ester content, preferably 70 mole percent ester content. Of these preferred aromatic copolyestercarbonates it is preferred to have at least 50 mole percent. of the ester content be isophthalate, and more preferred to have greater than 75 percent of the ester content isophthalate.

Below are examples of the invention which are utilized to demonstrate the specific advantages and properties of the invention. These examples are intended to be illustrative and not narrow the broad inventive concept.

EXAMPLE 1

Bisphenol-A copolyestercarbonates having 40 mole percent ester content which was 100 percent terephthalate, or 100 percent isophthalate were prepared using 3.2, mole percent of various chainstoppers and tested for a number of properties.

KI is a measure of melt viscosity of the resin and is calculated according to the procedure of U.S. Pat. No. 4,506,065, column 3, line 60 to column 4, line 13. The KI appearing in all the Tables is measured in centiseconds (cs). The higher the number, the more viscous is the melt.

TABLE I

EFFECT OF 3.2 MOLE % CHAIN STOPPER ON PERFORMANCE FOR POLYTEREPHTHALATE CARBONATES

| | CHAIN STOPPER | | |
|---|---|---|---|
| PROPERTY | PHENOL | PTBP[1] | PCP[2] |
| Tensile Yield (PSI) | 9693 | 9433 | 9397 |
| Tensile Break (PSI) | 12,810 | 12,930 | 13,980 |
| Tensile Elongation (%) | 68.1 | 68.3 | 80.8 |
| Flexural Yield (PSI) | 13,810 | 13,220 | 13,510 |
| Flexural Modulus (PSI) | 304,500 | 298,500 | 313,100 |
| DTUL (°C.) | 156.6 | 163.0 | 162.6 |
| .125 in. Notched Izod (ft. lbs./in.) | 8.0 | 6.9 | 6.9 |
| .250 in. Notched Izod (ft. lbs./in.) | 7.8 | 7.2 | 7.8 |
| .125 in. Double Gate Izod (ft. lbs./in.) | 37.3* | 36.6* | 37.9** |
| S-Tensile Impact (ft. lbs./in.$^2$) | 184 | 209 | 181 |
| Yellowness Index | 8.2 | 8.3 | 8.2 |
| Melt Viscosity (KI, 6 min.) cs. | 72,800 | 116,860 | 86,780 |
| Melt Viscosity (KI part) cs. | 60,130 | 88,240 | 70,910 |
| Melt Stability (%) | 83 | 76 | 82 |

[1]Para tertiarybutyl phenol
[2]Paracumyl phenol
*100% Brittle Failure
**100% Ductile Failure Impact properties were significantly enhanced by changing from completely brittle in the double gate unnotched test system to completely ductile as well as increased tensile elongation with PCP endcapping agent.

TABLE II

EFFECT OF 3.2 MOLE % CHAIN STOPPER ON PERFORMANCE FOR POLYISOPHTHALATE CARBONATES

| | CHAIN STOPPER | | |
|---|---|---|---|
| PROPERTY | PHENOL | PTBP[1] | PCP[2] |
| Tensile Yield (PSI) | - | 9753 | 9634 |
| Tensile Break (PSI) | 9956 | 12,280 | 11,760 |
| Tensile Elongation (%) | 10,620 | 107.1 | 101.6 |
| Flexural Yield (PSI) | 80.3 | 14,630 | 14,530 |
| Flexural Modulus (PSI) | 14,890 | 317,600 | 317,600 |
| DTUL (°C.) | 326,900 | 152.4 | 151.1 |
| .125 in. Notched Izod (ft. lbs./in.) | 149.6 | 13.5 | 11.6 |
| .250 in. Notched Izod (ft. lbs./in.) | 10.3 | 2.1 | 2.1 |
| .125 in. Double Gate Izod (ft. lbs./in.) | 2.4 | 34.6* | 39.3** |
| S-Tensile Impact (ft. lbs./in.$^2$) | 39.9* | 305 | 279 |
| Yellowness Index | 345 | 4.3 | 4.3 |
| Melt Viscosity (KI, 6 min.) cs. | 4.5 | 17,310 | 17,360 |
| Melt Viscosity (KI part) cs. | 17,130 | 15,270 | 15,530 |
| Melt Stability (%) | 15,990 | 88 | 89 |
| | 93 | | |

[1]Para tertiarybutyl phenol
[2]Paracumyl phenol
*100% Brittle Failure
**100% Ductile Failure The PCP endcapped copolyestercarbonates show an increase in the impact resistance with respect to a shift to a completely ductile break from a completely brittle break in the double gate impact test.

TABLE III

RETENTION OF IMPACT AFTER VARIOUS HOURS OF EXPOSURE TO HEAT (90° C.) FOR THE 100% POLYISOPHTHALATE COPOLYESTERCARBONATE

| CHAIN STOPPER | .125 IN. NOTCHED IZOD AFTER HOURS OF EXPOSURE ft. lb./in. | | | | | | | |
|---|---|---|---|---|---|---|---|---|
| | 0 | 1 | 2 | 4 | 8 | 16 | 24 | 48 | 96 |
| Phenol | 10.3 | 3.6 | 3.3 | | | | | | |
| PTBP | 13.5 | 14.9 | 13.4 | 3.8 | 3.4 | | | | |
| PCP | 11.6 | 13.1 | 14.0 | 13.2 | 13.3 | 3.4 | 13.7 | 13.8 | 3.9 |

In this testing of impact resistance retention after aging the ⅛ inch Notched Izod bar at elevated temperature, the 100 percent polyisophthalate PCP endcapped polycarbonate clearly outperformed the PTBP and phenol endcapped polymer.

When the 100 percent terephthalate PCP endcapped copolyestercarbonates were tested, there was no significant difference over the phenol or PTBP endcapped copolyestercarbonates.

In the following Tables, copolyestercarbonates were tested and prepared from bisphenol-A, terephthaloyl chloride, isophthaloyl chloride and phosgene while utilizing different levels, based on bisphenol-A of the chainstoppers paratertiarybutylphenol (PTBP) and PCP. The copolyestercarbonate prepared has 78 weight percent ester content of which 93% is isophthalate and 7% is terephthalate.

KI is a measure of melt viscosity of the resin and is calculated according to the procedure of U.S. Pat. No. 4,506,065, column 3, line 60 to column 4, line 13.

TABLE IV

| | PHENOL | | PTBP | | PCP | |
|---|---|---|---|---|---|---|
| % CHAIN-STOPPER | KI CSEC | DTUL °F. | KI CSEC | DTUL °F. | KI CSEC | DTUL °F. |
| 3.5 | 40,270 | 322 | 34,460 | 327 | 44,760 | 325 |
| 4.2 | 26,570 | 319 | 28,830 | 317 | 25,320 | 319 |
| 4.4 | 17,510 | 312 | 19,370 | 323 | 20,200 | 321 |
| 4.6 | 17,970 | 317 | 17,220 | 319 | 17,420 | 320 |

In general, the data of Table IV shows that with PCP the melt viscosity is substantially lowered but the distortion temperature under load is significantly maintained in comparison to the phenol endcapped copolyestercarbonates. Therefore, a more easily processable but still highly temperature resistant polymer is present when PCP is used as the endcapping agent.

In Table V below, the KI's of extruded pellets as well as a molded part were measured. The ⅛ inch Notched Izod, DTUL°F and Yellowness Index of molded parts were also measured. Below are the results:

TABLE V

| MOLE % PCP | KI CS PELLET | PART | ⅛ NI ft. lb/in | DTUL °F. | YI |
|---|---|---|---|---|---|
| 3.5 | 44,200 | 39,210 | 10.1 | 318 | 6.4 |
| 4.2 | 25,090 | 21,920 | 9.3 | 320 | 5.5 |
| 4.4 | 20,200 | 19,730 | 10.1 | 320 | 4.0 |
| 4.6 | 17,150 | 16,190 | 9.6 | 320 | 3.6 |

The loss of melt viscosity from pellet to part was significantly reduced as the chain stopper level was increased to 4.6% from 3.5%, i.e. from 88% retention to 94% retention. The impact resistance and the DTUL stayed essentially the same while the Y.I. actually improved.

Parts were then tested for ⅛ inch Notched Izod impact resistance, after aging at 90° C. for a specific number of hours.

TABLE VI

| MOLE % PCP | X = HOURS AT 90° C. WHILE RETAINING INITIAL IMPACT | |
|---|---|---|
| | PTBP | PCP |
| 3.5 | 8 < X < 24 | > 144 |
| 4.2 | X < 1 | 24 < X < 48 |
| 4.4 | X < 1 | 4 < X < 8 |
| 4.6 | X < 1 | 1 < X < 2 |

From this data it is very clear that the PCP endcapped copolyestercarbonate retains its impact strength for a substantially longer period of time when aged at an elevated temperature than the phenol or PTBP endcapped copolyestercarbonate.

In summation, the collected data shows that the use of the PCP endcapping agent in comparison to the standard phenol or PTBP endcapping agent for aromatic copolyestercarbonates brings about significant unexpected improvements in the impact properties of the hhigh isophthalate aromatic copolyestercarbonates. PCP allows the use of higher levels of chainstopper and a resulting reduction melt viscosity, i.e. an improvement in processability, without sacrificing certain physical properties, especially retention of impact. Similar improvements are not observed for high terephthalate polymers.

What is claimed is:

1. A composition comprising a paracumylphenol endcapped aromatic copolyestercarbonate having from at least about 50 to about 95 mole percent ester content which comprises isophthalate or isophthalate and terephthalate units wherein no more than about 50 mole percent of the ester content is terephthalate.

2. The composition of claim 1 wherein the copolyestercarbonate has units of bisphenol-A residue.

3. The composition of claim 2 wherein the ester content of the copolyestercarbonate has no greater than about 35 mole percent terephthalate.

4. The composition of claim 2 wherein the ester content of copolyestercarbonate has no greater than about 25 mole percent of terephthalate.

5. The composition of claim 4 wherein the ester content of copolyestercarbonate is at least about 75 mole percent isophthalate.

6. The composition of clam 1 wherein the ester content of the copolyestercarbonate is at least about 50 mole percent isophthalate.

7. The composition of claim 1 wherein the copolyestercarbonate has both units of isophthalate and terephthalate.

8. The composition of claim 7 wherein the ester content of the copolyestercarbonate is at least about 50% isophthalate.

9. The composition of claim 1 wherein there is at least about 70 mole percent ester content.

10. The composition of claim 9 wherein the copolyestercarbonate has units of bisphenol-A residue.

11. The composition of claim 10 wherein the copolyestercarbonate has both units of isopthalate and terephthalate.

12. The composition of claim 11 wherein the ester content of the copolyestercarbonate is at least about 50 percent isophthalate.

13. A composition comprising a paracumylphenol endcapped bisphenol-A residue containing aromatic copolyestercarbonate having from 40 to about 95 mole percent ester content which comprises isophthalate or isophthalate and terephthalate units wherein no more than abut 50 mole percent of the ester content is terephthalate.

* * * * *